Patented July 17, 1934

1,966,856

UNITED STATES PATENT OFFICE 1,966,856

PLASTIC COMPOSITION

Frazier Groff, Charleston, W. Va., assignor to Carbide & Carbon Chemicals Corporation, a corporation of New York No Drawing. Application August 10, 1931, Serial No. 556,300

10 Claims. (Cl. 106—22)

The invention relates to plastic compositions containing vinyl resins, that is, resins formed by the polymerization of certain vinyl compounds.

Vinyl resins of various types are known and various uses have been proposed for these substances. Previously prepared plastic compositions containing vinyl resins have not been uniformly satisfactory. It has been proposed to make improved vinyl resins by polymerizing a mixture of vinyl compounds, and by including other substances in the resins. These proposals have resulted in generally improved vinyl resins, but vinyl resins possessing the requisite uniformity of properties to make plastic compositions prepared from them economically successful have not been heretofore known.

The principal object of my invention is to provide a novel type of vinyl resins possessing uniformly desirable properties for the preparation of plastic compositions. Another object is to provide a novel molding composition containing vinyl resins, which is especially useful for forming phonograph or other sound records. Another object is to provide a novel plastic composition suitable for use as a wall or floor surfacing material, and still another object is to provide a novel moisture-proof packaging and insulating material.

The vinyl resins employed in my new plastic compositions are those which are obtained by the conjoint polymerization (by which is meant polymerization while in mutual contact) of a vinyl halide and a vinylester of an aliphatic acid. I prefer to use vinyl resins formed by the conjoint polymerization of vinyl chloride and vinyl acetate in the presence of a polymerizing catalyst. The preferred proportions by weight of vinyl chloride to vinyl acetate are 70% or more of vinyl chloride and 30% or less of vinyl acetate. Throughout the specification and the claims all the new compositions will be described on a percentage or parts by weight basis.

I have found by test that the vinyl resins above described are best suited to the formation of the plastic compositions of the present invention. However, not every vinyl resin formed by the conjoint polymerization of 70% or more of vinyl chloride and 30% or less of vinyl acetate is suitable for use in the new plastic compositions. The resins must further possess a high fusion point, low solubility, and must be tough, stable and resistant to heat. In order to make my novel plastics economically practical, the resins contained therein must be of uniform quality with respect to the properties set forth. A uniform vinyl resin of this type may be characterized by indicating the extent to which it is soluble in certain solvents, since this property is an accurate indication of the other properties of the resin. I therefore designate the vinyl resin which is preferred as an ingredient of my plastic compositions, as a resin resulting from the conjoint polymerization of vinyl chloride and vinyl acetate in the proportions of 70% or more of vinyl chloride and 30% or less of vinyl acetate, less than about 30% of the resin being soluble in cold (20° to 30° C.) toluene.

The preferred type of resins may be produced by causing a mixture of the vinyl compounds in the proportions thereof as set forth above to be polymerized in the presence of a suitable liquid medium, such as aliphatic paraffin hydrocarbons, aliphatic alcohols, and aliphatic ketones, and in the presence of a suitable polymerizing catalyst, such as benzoyl peroxide, at temperatures below about 60° C. The process of forming such vinyl resins does not form an essential part of the present invention.

In order to insure complete stability of the vinyl resin it is generally desirable to add to the resin a stabilizing substance or susbtances. In general, suitable stabilizing agents are basic in property and do not promote acid formation or oxidation. Examples of suitable stabilizers are: alkaline earth metal soaps, resinates, oxides, hydrates and carbonates; aromatic amino compounds which are water insoluble; other amines or ammonia and its substitution products generally. Specifically, calcium stearate, lime, the reaction product of calcium hydrate and manilla copal resin, ethyl toluidine, benzidine, tribenzyl amine, and the ethanolamines are preferred stabilizers. I have discovered that the preparation of light colored vinyl resin plastics is facilitated, and that the colors are more stable toward light, if titanium oxide or calcium carbonate, or both are included in the plastic composition.

The vinyl resin plastics may be readily prepared in permanent colors of any shade by the addition of dyes, lakes or pigments.

The above described vinyl resins which may be stabilized and colored as desired are the basic ingredients of my new plastics. Certain plastic compositions require the inclusion of filling materials. I have found that cellulosic or non-cellulosic fillers in various proportions may be used with the vinyl resins. Examples of cellulosic fillers are wood flour, cork, cotton flock, cotton linters and paper pulp; examples of non-cellulosic fillers are barytes, silica, mica, asbestos, talc and rottenstone.

The plasticity of the plastic compositions may be altered and their flexibility and resilience may be varied by the addition of various plasticizers or modifying agents to the compositions. Typical plasticizers and modifiers are phthalic acid esters, halogenated napthalene derivatives, carnauba wax, certain rubber fractions, chlorinated diphenyl derivatives, tricresyl derivatives and glycol esters.

I am enabled to produce a wide variety of new plastic compositions by means of the above additions to the vinyl resins. The nature and properties of the plastic products are governed by the choice of ingredients and amounts thereof which are incorporated with the vinyl resin.

In general, plastic compositions which are adapted to the formation of molded objects by the application of thermo-plastic molding operations are prepared by incorporating from about 25 to 70 parts of a filling material and 1 to 5 parts of a plasticizer with from about 75 to 30 parts of the preferred vinyl resin, which may be colored and stabilized as desired. The molding compositions may be varied by using larger amounts of plasticizing materials, and molding lubricants may be used optionally. In some instances the unfilled resin may be used to form molded objects. For example, the unfilled resin, with or without plasticizers or modifying agents, and colored as desired, may be used to form dentures and the like.

Another type of plastic composition has as its basic ingredient a vinyl resin of the preferred type in conjunction with a large proportion of a plasticizing material. This composition may be formed into thin sheets and is useful as a moisture-proof, insulating packaging material. It may vary in thickness from 0.0004 inch to 0.250 inch and may be colored, opaque, transparent or translucent as desired. The sheets are very flexible and if suitable plasticizers are chosen, the plastics are resilient and flexible over a wide temperature range, including very low temperatures, i.e.—10° C. or lower. This material is useful not only as a protective or ornamental packaging material but as an electrical insulating material for use in cable, condenser and switchboard insulation.

If it is intended as a packaging material its attractiveness may be enhanced by including various odoriferous substances in the composition to produce a perfumed wrapping material. It may be easily cemented to form seals and joints by softening the sheet with a solvent for the composition and then applying pressure.

The plasticized flexible material may be incorporated with a filler, such as cork dust or asbestos, and secured to a fibrous backing, for example, burlap, to form a linoleum-like product suitable for covering floors and walls. This product may be formed either by hot pressing the plastic against the backing or by securing a preformed sheet of the plastic to the backing with an adhesive, such as a solution of a vinyl resin in acetone. The resultant product may be cut, bent, nailed and treated in the usual way as a floor-covering material, and possesses good wearing qualities. The plastic and filler may be mixed into a paste with a medium-boiling solvent and used as a troweling composition to fill joints in the floor or wall covering material. In this case the plastic is hardened by the evaporation of the solvent.

The compositions of my invention are substantially non-flammable as evidenced by the fact that a vinyl resin composition containing 50% of wood flour will not support combustion. Also, they are odorless, resistant to water, chemically inert and dielectric.

The following examples are illustrative of the invention:

I. A molding composition was prepared as follows:

50 parts of vinyl resin
    30 parts of ground barytes
    20 parts of rottenstone
    0.5 parts of carnauba wax
    0.5 parts of calcium stearate
    0.5 parts of lime The vinyl resin was prepared by polymerizing a mixture containing 80% of vinyl chloride and 20% of vinyl acetate in the presence of benzoyl peroxide, and was less than 25% soluble in cold toluene. The materials were mixed and milled to form a substantially homogeneous composition.

The composition is suitable for molding various articles, particularly phonograph records, both of the rigid and flexible type. The composition may be used to form phonograph records directly, or they may be formed by molding the composition over a flexible cellulosic or similar sheet. By the use of this composition it is possible to make flexible records having either one or two playing surfaces. The formation of these flexible records is facilitated because the use of solvents in applying the vinyl resin playing surface or surfaces is unnecessary, the coating being applied by a hot pressing operation. Rigid records formed from vinyl resin compositions may be produced in thicknesses down to about 0.025 inch and are characterized by unusual toughness and mechanical strength.

In every case the records produced possess a high degree of water resistance and resistance to atmospheric conditions. Also, the records are extremely resistant to needle wear and exhibit but slight wear on the needle. This latter property is shown by the fact that a single needle may be used to play a record formed from a vinyl resin composition 200 times before becoming worn sufficiently to require replacement, while by comparison, the same type of needle can be used to play records of the kind now commercially available but once before being worn to the same degree. The records formed from vinyl resins are also characterized by an extremely low surface noise level. This characteristic, together with the mechanical strength of the resin and the accuracy with which it may be molded, makes it possible to form records having more recorded sound per square inch of playing surface than is possible with records formed from other materials.

II. Another molding composition for general use, and for sound records, was prepared as follows:

500 parts of vinyl resin
    5 parts of calcium stearate and lime
    5 parts of carnauba wax
    40 parts of fibrous talc
    435 parts of cotton flock
    25 parts of coloring materials The vinyl resin of this composition was prepared as described in Example I, and was about 88% insoluble in cold toluene.

III. A simple molding composition may be as follows:

200 parts of vinyl resin
200 parts of wood flour
8 parts of carbon black

The vinyl resin used in this composition was identical with that of Example I and was previously stabilized. The molding composition of this example is useful for forming molded objects of low cost. It produces objects which are hard but not brittle.

The molding operations by which these compositions may be utilized are the usual thermoplastic operations employing heat and pressure. For example, bars consisting of 31 grams of the composition of Example III were molded under 1000 pounds per square inch of pressure at 130° C. for 8 minutes. They were then cooled under a pressure of about 400 pounds per square inch. The molding conditions are dependent upon the molding composition, the object molded and upon each other, and are subject to wide variations. In general pressures from 200 to 2000 pounds per square inch may be used and temperatures of about 130° to 140° C. are preferred.

IV. A highly plastic composition was formed as follows:

100 parts of vinyl resin
60 parts of ethylene glycol monoethyl ether diester of ethylene glycol diphthalate
1 part of carnauba wax
1 part of calcium stearate
1 part of calcium hydrate The vinyl resin was a product formed by the conjoint polymerization of 80 parts of vinyl chloride and 20 parts of vinyl acetate and was less than 30% soluble in cold toluene. The ingredients of this composition were mixed by fluxing on hot (100° to 120° C.) differential rolls, and the mix was sheeted out. This composition is well adapted as an ingredient of varnishes or lacquers and may be mixed with filling materials to form molded articles possessing a high degree of resilience and flexibility. Sheets of this composition retained their flexibility and discolored but slightly after 100 hours of exposure to the radiation from a mercury arc lamp at a distance of 20 inches from the bulb.

V. The composition of this example was composed of the following:

100 parts of vinyl resin
10 parts of diethylene glycol monophthalate previously neutralized with orthotoluidine The resin used in this composition was the same as that of Example IV. The mixture was fluxed on differential rolls heated to 80° to 120° C. until a uniform mix was secured. This may be lubricated with carnauba wax and molded to form tough, flexible phonograph records having the desirable properties above described. If it is desired, filling materials, such as wood flour or barytes, may be added to this composition, and sheets of the filled material may be molded over paper to form flexible phonograph records. This type of record is especially adapted for use in forming reproducing records for home recording.

VI. A tough, plasticized composition was produced as follows:

100 parts of vinyl resin
10 parts of ethylene glycol monomethyl ether phthalate neutralized with tribenzylamine
1 part of carnauba wax
0.5 part of calcium stearate
0.5 part of calcium hydrate
100 parts of cotton flock The vinyl resin was identical with the resin described in Example IV. The ingredients of this composition were mixed and then rolled on differential rolls heated to about 110° to 130° C. This composition is well adapted for surfacing soft cores, metal sheets, and the like by molding operations. The toughness of this composition is demonstrated by the fact that a nail was driven through the center of a disc 2 inches in diameter and ¼ inch in thickness molded from this composition without splitting or cracking the disc.

VII. An example of a floor covering material is as follows:

100 parts of vinyl resin
40 parts of ethylene glycol monoethyl ether diester of ethylene glycol diphthalate
140 parts of ground cork
70 parts of barytes The vinyl resin was formed by conjointly polymerizing 80 parts of vinyl chloride and 20 parts of vinyl acetate, and was 85% insoluble in toluene at 25° C. The ingredients were thoroughly mixed by fluxing on heated differential rolls and formed into sheets. These sheets were then molded over burlap to form a linoleum-like product which possessed excellent wearing qualities.

VIII. Another floor covering material was prepared as follows:

310 parts of a 40% solution of vinyl resin in ethyl acetate
60 parts of ethylene glycol monoethyl ether diester of ethylene glycol diphthalate
3 parts of ortho-toluidine
100 parts of acetone
230 parts of approximately 6 to 8 mesh ground cork
2 parts of calcium stearate
3 parts of carnauba wax These ingredients were thoroughly mixed and air-dried. The vinyl resin used was identical with the resin described in Example VII. The resulting mixture was a thick, viscous mass characterized by a crawling type of flow. A portion of this mix was distributed over burlap and the residual solvent was evaporated. This piece was then densified by a hot-pressing operation under a pressure of about 150 pounds per square inch. This material was very flexible and tough and resembled a flexible linoleum.

Another portion of this mix was dried to remove the solvent, distributed over a sheet of burlap and hot-pressed under a pressure of about 100 pounds per square inch. The product was very similar to that formed in the first operation.

IX. A troweling composition was formed by mixing 100 parts of vinyl resin plasticized with 30% of its weight of ethylene glycol monoethyl ether diester of ethylene glycol disphtalate
300 parts of acetone
150 parts of asbestos
20 parts of ground cork When a uniform mixture had been obtained, it could be applied to any desired surface by a troweling operation. About 12 hours of air drying was sufficient to eliminate all the solvent and the resultant coating was tough, adhesive and resilient. It adhered well to wood, metal, burlap, paper, and the like. A smooth surface may be imparted to this coating by applying a surface coating of a vinyl resin solution. The resin used in forming this composition was identical with that used in Example VII.

X. A transparent flexible wrapping material was produced as follows:

100 parts of vinyl resin
20 parts of dibutyl phthalate
1.5 parts of carnauba wax
1 part of calcium stearate The resin was produced by conjointly polymerizing 80 parts of vinyl chloride and 20 parts of vinyl acetate, and was about 75% insoluble in toluene at 25° C. These materials were fluxed on hot differential rolls and sheeted out in sheets of about 0.001 inch in thickness. These sheets are useful as a moisture-proof, non-flammable packaging material, or as an insulating material. The material is tough, flexible, resistant to heat and ultra-violet light, and possesses good tensile strength. It may be perfumed, colored, and produced in any thickness and degree of transparency.

XI. The process of forming the material of Example X may be modified by dissolving 240 parts of the composition of Example X in 400 parts of acetone and 200 parts of ethyl acetate. The solution is formed into sheets by pouring it onto a plate of polished metal, infusible phenolic resin plastic, or glass. The plasticized composition described has but slight tendency to adhere to the materials on which it is plated, and such tendency may be eliminated by lubricating the plate with a substance, such as carnauba wax. The sheets are suitable for use as wrapping or insulating materials, and may be formed into thicker or thinner sheets by pressing or calendaring the sheets which were originally formed.

From the foregoing description the method of practicing my invention and the uses of my new plastic compositions will be apparent. Modifications of the invention are possible and are included in my invention as defined by the appended claims.

I claim:—

1. A plastic composition comprising a substantial proportion of vinyl resin together with basic stabilizing material, said vinyl resin being identical with that resulting from the conjoint polymerization of a vinyl halide and a vinyl ester of an aliphatic acid in the proportions of at least 70% of the vinyl halide and said vinyl resin being at least about 70% insoluble in toluene at 20° to 30° C.

2. A plastic composition comprising a substantial proportion of vinyl resin together with basic stabilizing material, said vinyl resin being identical with that resulting from the conjoint polymerization of vinyl chloride and vinyl acetate in the proportions of at least 70% of the vinyl chloride and said vinyl resin being at least about 70% insoluble in toluene at 20° to 30° C.

3. A plastic composition comprising a substantial proportion of vinyl resin together with basic stabilizing material, said vinyl resin being identical with that resulting from the conjoint polymerization of vinyl chloride and vinyl acetate in the proportions of about 80% of the vinyl chloride and said vinyl resin being at least about 70% insoluble in toluene at 20° to 30° C.

4. A plastic composition comprising a substantial proportion of vinyl resin together with basic stabilizing material and plasticizing material, said vinyl resin being identical with that resulting from the conjoint polymerization of a vinyl halide and a vinyl ester of an aliphatic acid in the proportions of at least 70% of the vinyl halide and said vinyl resin being at least about 70% insoluble in toluene at 20° to 30° C.

5. A plastic composition comprising a substantial proportion of vinyl resin together with basic stabilizing material and plasticizing material, said vinyl resin being identical with that resulting from the conjoint polymerization of vinyl chloride and vinyl acetate in the proportions of at least 70% of the vinyl chloride and said vinyl resin being at least about 70% insoluble in toluene at 20° to 30° C.

6. A plastic composition comprising a substantial proportion of vinyl resin together with basic stabilizing material and plasticizing material, said vinyl resin being identical with that resulting from the conjoint polymerization of vinyl chloride and vinyl acetate in the proportions of about 80% of the vinyl chloride and said vinyl resin being at least about 70% insoluble in toluene at 20° to 30° C.

7. A plastic composition comprising a substantial proportion of vinyl resin together with basic stabilizing material, and filling material, said vinyl resin being identical with that resulting from the conjoint polymerization of a vinyl halide and a vinyl ester of an aliphatic acid in the proportions of at least 70% of the vinyl halide and said vinyl resin being at least about 70% insoluble in toluene at 20° to 30° C.

8. A plastic composition comprising a substantial proportion of vinyl resin together with basic stabilizing material, plasticizing material and filling material, said vinyl resin being identical with that resulting from the conjoint polymerization of a vinyl halide and vinyl ester of an aliphatic acid in the proportions of at least 70% of the vinyl halide and said vinyl resin being at least about 70% insoluble in toluene at 20° to 30° C.

9. A plastic composition comprising a substantial proportion of vinyl resin together with basic stabilizing material and filling material, said vinyl resin being identical with that resulting from the conjoint polymerization of vinyl chloride and vinyl acetate in the proportions of about 80% of the vinyl chloride and said vinyl resin being at least about 70% insoluble in toluene at 20° to 30° C.

10. A plastic composition comprising a substantial proportion of vinyl resin together with basic stabilizing material, plasticing material and filling material, said vinyl resin being identical with that resulting from the conjoint polymerization of vinyl chloride and vinyl acetate in the proportions of about 80% of the vinyl chloride and said vinyl resin being at least about 70% insoluble in toluene at 20° to 30° C.

FRAZIER GROFF.